United States Patent [19]
Roan et al.

[11] Patent Number: 5,673,964
[45] Date of Patent: Oct. 7, 1997

[54] INTEGRAL CENTER-MOUNTED AIRHANDLING SYSTEM WITH INTEGRAL INSTRUMENT PANEL AIR-CONDITIONING DUCT AND STRUCTURAL BEAM

[75] Inventors: Jeff E. Roan, Northville; Bipin D. Parekh, Plymouth, both of Mich.; Jeffery J. Schultz, Highland Heights, Ky.; Pravin R. Shah, Northville, Mich.

[73] Assignee: Ford Motor Company, Dearborn, Mich.

[21] Appl. No.: 511,576

[22] Filed: Aug. 4, 1995

[51] Int. Cl.⁶ .................................................. B60R 27/00
[52] U.S. Cl. .................... 296/208; 296/194; 454/127; 454/121; 454/161
[58] Field of Search .................... 296/194, 208, 296/192, 70, 196, 197; 180/90; 454/127, 121, 126, 160, 161, 144, 156; 165/42; 237/12.3 A

[56] References Cited

U.S. PATENT DOCUMENTS

| | | | |
|---|---|---|---|
| 3,326,110 | 6/1967 | Orr | 454/160 |
| 3,327,603 | 6/1967 | Castelet | 454/161 |
| 3,724,357 | 4/1973 | Kavthekar et al. | 454/152 |
| 4,223,754 | 9/1980 | Mizuno et al. | 180/90 |
| 4,476,773 | 10/1984 | Fehr | 454/121 |
| 4,531,671 | 7/1985 | Schwenk | 237/12.3 B |
| 4,559,868 | 12/1985 | Nonaka et al. | 454/127 |
| 4,582,252 | 4/1986 | Ogihara et al. | 237/12.3 A |
| 4,646,879 | 3/1987 | Mahler et al. | 180/90 |
| 4,759,568 | 7/1988 | Paefgen et al. | 280/732 |
| 4,805,522 | 2/1989 | Tonoe et al. | 454/127 |
| 4,907,497 | 3/1990 | Danieau | 454/156 |
| 4,962,961 | 10/1990 | Ito et al. | 296/192 |
| 5,005,898 | 4/1991 | Benedetto et al. | 296/194 |
| 5,042,566 | 8/1991 | Hildebrand | 165/42 |
| 5,063,832 | 11/1991 | Mirumachi et al. | 454/69 |
| 5,088,571 | 2/1992 | Burry et al. | 180/90 |
| 5,111,738 | 5/1992 | Becquerel | 454/159 |
| 5,173,078 | 12/1992 | Robin et al. | 454/126 |
| 5,217,405 | 6/1993 | Tanaka | 454/121 |
| 5,335,718 | 8/1994 | Smith | 165/42 |
| 5,354,114 | 10/1994 | Kelman et al. | 296/192 |

*Primary Examiner*—Joseph D. Pape
*Attorney, Agent, or Firm*—Schwartz & Weinrieb

[57] ABSTRACT

An integral center-mounted airhandling system includes a pair of blowers (211), an evaporator core (260), and a heater core (262) located within the center of the vehicle such that the vehicle can be readily adapted for left-side or right-side steering mechanisms. The blowers (211), evaporator core (260), and heater core (262) are preferably incorporated within a single, one-piece housing (213) so as to reduce materials, manufacturing, and assembling costs. The dual blowers (211) provide completely independent two zone operational and temperature control for the driver and passenger sides of the vehicle, as well as operational redundancy and conservation of electrical power within electrically powered vehicles. The instrument panel duct assembly (218) is fabricated from a carbon composite material so as to also serve as a structural cross-beam within the vehicle thereby eliminating the need for separate structural cross-beam structure which also reduces materials, fabrication, and assembly costs for the vehicle, as well as the overall weight of the vehicle.

20 Claims, 7 Drawing Sheets

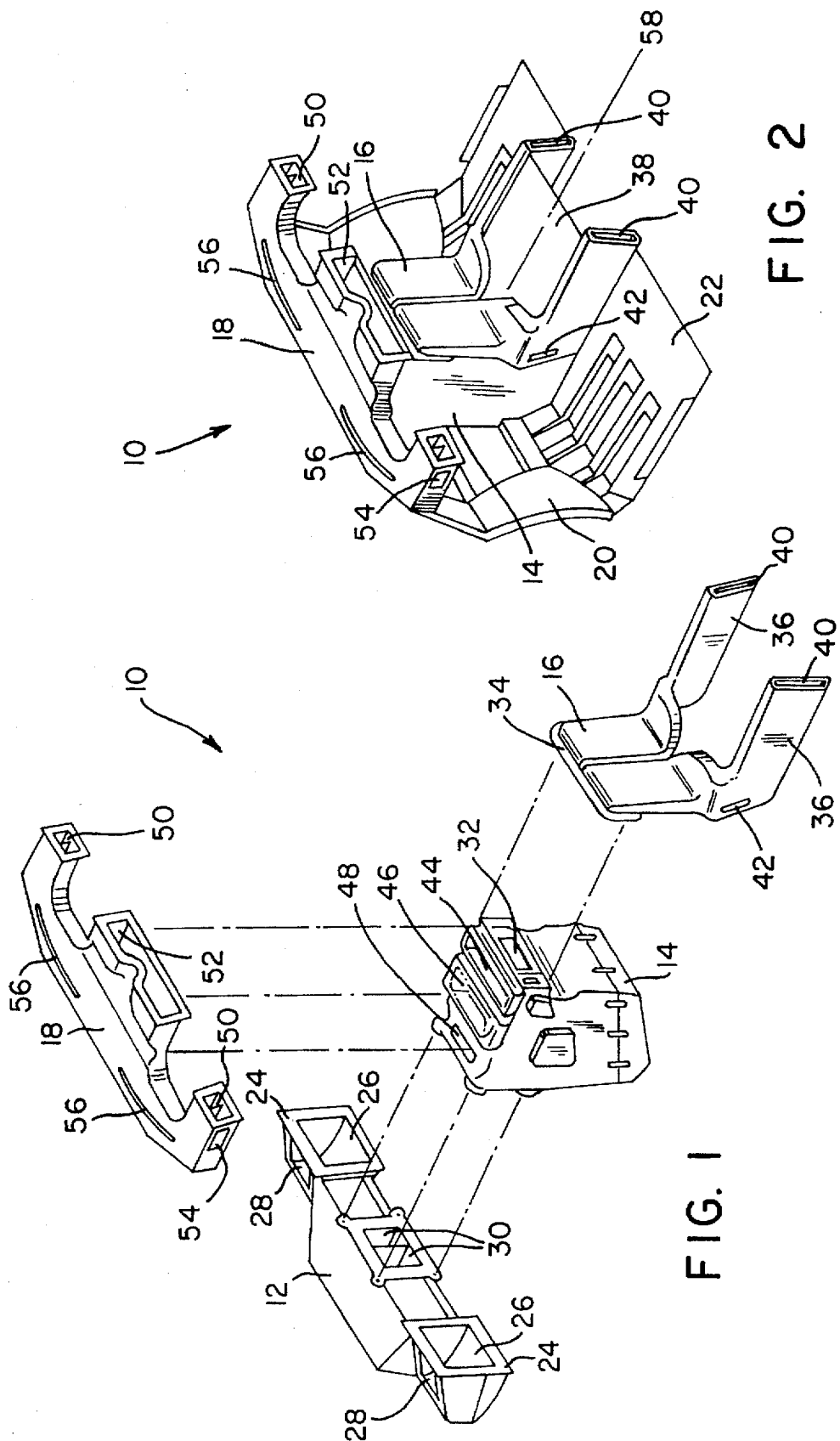

INTEGRAL CENTER-MOUNTED AIRHANDLING SYSTEM WITH INTEGRAL INSTRUMENT PANEL AIR-CONDITIONING DUCT AND STRUCTURAL BEAM

TECHNICAL FIELD

The present invention relates generally to air-handling systems within automotive vehicles, and more particularly to an integral, center-mounted air-handling system which has an integral instrument panel air-conditioning duct and structural beam incorporated therein.

BACKGROUND ART

The prior art is of course replete with many different types of air-handling systems within automotive vehicles. The most current or advanced types of air-handling systems even include technological innovations which permit, for example, the vehicle driver and passenger to effectively create different temperature zones within their effective areas or regions of the vehicle. However, such systems do not comprise separate and independent blowers, but to the contrary, are operatively dependent upon the same single blower. Consequently, such systems would not be readily adaptable or feasible in connection with their incorporation within the next generation of automotive vehicles which will be powered solely by electricity. As can be readily appreciated, within such electrically powered vehicles, the amount of electricity available for a predetermined amount of time or in connection with the ability to travel a predetermined distance upon a single battery charge will obviously be limited, and therefore, it is desirable to be able to conserve the electrical power in any feasible or practical manner. Accordingly, a dual blower, dual zone climate-control system would be highly desirable within such electrically powered vehicles in view of the fact that when both a driver and passenger are present within the vehicle, each one of the two blower systems would be operative, however, if, for example, only the driver was present within the vehicle, the blower for the passenger side of the vehicle may be rendered inoperative thereby conserving electricity. In addition, it would also be desirable to incorporate a dual blower system into an automotive vehicle for redundancy purposes whereby in case one of the blowers becomes inoperative due to a mechanical breakdown or other type of malfunction, the other blower could nevertheless provide desired heating or air-conditioning.

Another disadvantage or drawback characteristic of conventional air-handling systems within currently designed automotive vehicles resides in the arrangement or disposition of the blower/evaporator core/heater core assembly within the vehicle. Although the air-handling ducts and air outlets are usually arranged within the vehicle in a substantially symmetrical manner such that outlet air-conditioned air, heated air, defrost air, and demist air are provided to all areas of the vehicle as desired or required, the blower/evaporator core/heater core assembly is usually disposed within the vehicle in a substantially asymmetrical manner. More particularly, the blower/evaporator core/heater core assembly is usually arranged within the vicinity of the floor region of the vehicle kickwall upon the passenger side of the vehicle so as to be disposed within or just above the foot well or compartment for the passenger's feet when the passenger is normally seated within the right side of the vehicle as is common or conventional within the United States. However, as is well known, major automotive manufacturers manufacture automotive vehicles not only for their domestic markets, but also for international or foreign markets. It is also well known that automotive vehicles are driven upon different sides of the road within different countries. For example, within the United States, automotive vehicles are driven on the right side of the roadway, the driver is seated within the left side of the vehicle, and the passenger is seated within the right side of the vehicle. In Japan and the United Kingdom, however, automotive vehicles are driven upon the left side of the roadway, the driver is seated within the right side of the vehicle, and the passenger is seated within the left side of the vehicle. Consequently, when automotive vehicles are manufactured, for example, within the United States but for both domestic and foreign markets, the steering column and its associated mechanisms must be placed within the vehicle upon either the left or right side of the vehicle accordingly, depending upon the particular market to which the particular vehicle will be distributed. However, as noted hereinabove, if the blower/evaporator core/heater core assembly is normally disposed within or just above the foot well or compartment for the passenger's feet, that is, upon the right side of the vehicle, as is customary within the United States, such an assembly will pose a significant interference problem in connection with the disposition of the steering column and its associated mechanisms within a vehicle which is to be produced with the steering column and its associated mechanisms located upon the right side of the vehicle. In such a case, the automotive vehicle must be redesigned so as to in fact accommodate the steering column and its associated mechanisms upon the right side of the vehicle. Redesigning a vehicle in such a manner in order to accommodate a rightside steering column and its associated mechanisms is quite costly, however, both in terms of design costs and manufacturing costs. Therefore, an arrangement for the blower/evaporator core/heater core assembly which can satisfy or accommodate both left-side and right-side steering columns is needed.

Still another drawback or disadvantage characteristic of conventional air-handling systems within currently designed automotive vehicles, and in particular, with respect to the structural composition thereof, resides in the fact that needless duplication of structural components, with attendant extra weight, as well as manufacturing and assembly costs, added to the vehicle, is present within the vehicles. For example, automotive vehicles conventionally comprise structural cross-beams extending laterally or transversely across the vehicles within the vicinity of the firewall separating the engine and passenger compartments. In addition, a main or primary air-handling duct is provided within the vehicle so as to conduct air-conditioned air, defrost air, and demist air outwardly therefrom, and this main or primary air-handling duct likewise extends transversely or laterally across the vehicle so as to provide such air flows to the various parts of the vehicle as desired or required. A need therefore exists whereby the functions and structures of such structural cross-beam and air-handling duct components can, in effect, be combined and incorporated into a single component whereby the aforenoted manufacturing, materials, and assembly costs, as well as the overall weight of the vehicle, can be significantly reduced.

DISCLOSURE OF THE INVENTION

Accordingly, it is an object of the present invention to provide a new and improved air-handling system for an automotive vehicle.

Another object of the present invention is to provide a new and improved air-handling system for an automotive vehicle wherein a fully independent, dual blower, dual zone air flow and temperature control system is provided.

Still another object of the present invention is to provide a new and improved air-handling system for an automotive vehicle wherein a dual blower, dual zone control system thereof achieves independent temperature comfort, electrical conservation, and operative redundancy objectives.

Yet another object of the present invention is to provide a new and improved air-handling system for an automotive vehicle wherein the blower/evaporator core/heater core assembly is mounted within the center of the vehicle as considered in the lateral or transverse direction.

A further object of the present invention is to provide a new and improved air-handling system for an automotive vehicle wherein the provision and disposition of a center-mounted air-handling system within the vehicle renders the vehicle readily adaptable for manufacture with either left-side or right-side mounted steering column assemblies.

A still further object of the present invention is to provide a new and improved air-handling system for an automotive vehicle wherein the primary air-handling duct extending laterally or transversely across the vehicle, and having the various instrument panel air, defroster air, and demister air outlets incorporated therein, also comprises a structural, transverse or cross-beam for the vehicle.

A yet further object of the present invention is to provide a new and improved air-handling system for an automotive vehicle wherein the combination primary air-handling duct and structural cross-beam significantly reduces materials, manufacturing, and assembly costs, as well as a reduction in the overall weight of the vehicle.

The foregoing and other objectives are achieved in accordance with the present invention through the provision of an air-handling system which comprises a pair of blowers disposed within a dual blower housing, an evaporator core/heater core housing fluidically connected to the dual blower housing for receiving outlet air therefrom, and a floor air duct assembly fluidically connected to a rear surface portion of the evaporator core/heater core housing for providing treated air to the front and rear seat regions of the vehicle. A main or primary instrument panel duct is fluidically connected to an upper surface portion of the evaporator core/heater core housing for receiving outlet air therefrom and for distributing such air as either instrument panel air-conditioned or cooling air, defroster air, or demister air. In accordance with a further embodiment of the present invention, the dual blower housing and evaporator core/heater core housing may be fabricated as a single housing unit, thereby reducing manufacturing and assembly costs. Regardless of whether or not the dual blower housing and the evaporator core/heater core housing comprise separate components or are effectively incorporated within a single housing unit, the dual blowers will provide fully independent dual zone temperature and climate control, will provide desirable redundancy in case of a mechanical malfunction or breakdown occurring within one of the blower units, and will enable one of the blower units, that is, for example, the blower unit serving the passenger side of the vehicle, to be operatively shut down by the driver so as to conserve electrical power requirements and usage such as, for example, when the driver is alone within an electrically powered vehicle.

The blower units and the evaporator core/heater core assembly are also disposed within the center of the vehicle as considered in the lateral or transverse direction across the vehicle, and such blower and evaporator core/heater core components can be located or disposed either within the engine compartment or the passenger compartment. Regardless of such disposition of such components, the location of the components within the center of the vehicle permits the vehicle to be readily adapted as either a left-side or right-side drive vehicle without any redesigning of the vehicle or repositioning of various components within the vehicle.

Lastly, in accordance with the objectives and teachings of the present invention, the primary air-handling duct extending laterally or transversely across the vehicle and having outlets provided therein for discharging panel cooling or air-conditioned air, defroster air, and demister air, is fabricated as a structural or cross-beam for the vehicle. In this manner, materials, manufacturing, and assembly costs, as well as the overall weight of the vehicle, are significantly reduced in view of the elimination of separate primary air-handling duct and structural cross-beam components.

BRIEF DESCRIPTION OF DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is an exploded view of a first embodiment of an integral, center-mounted air-handling system constructed in accordance with the teachings of the present invention;

FIG. 2 is an assembled perspective view of the air-handling system of FIG. 1;

MODES FOR CARRYING OUT THE INVENTION

Figure 3:
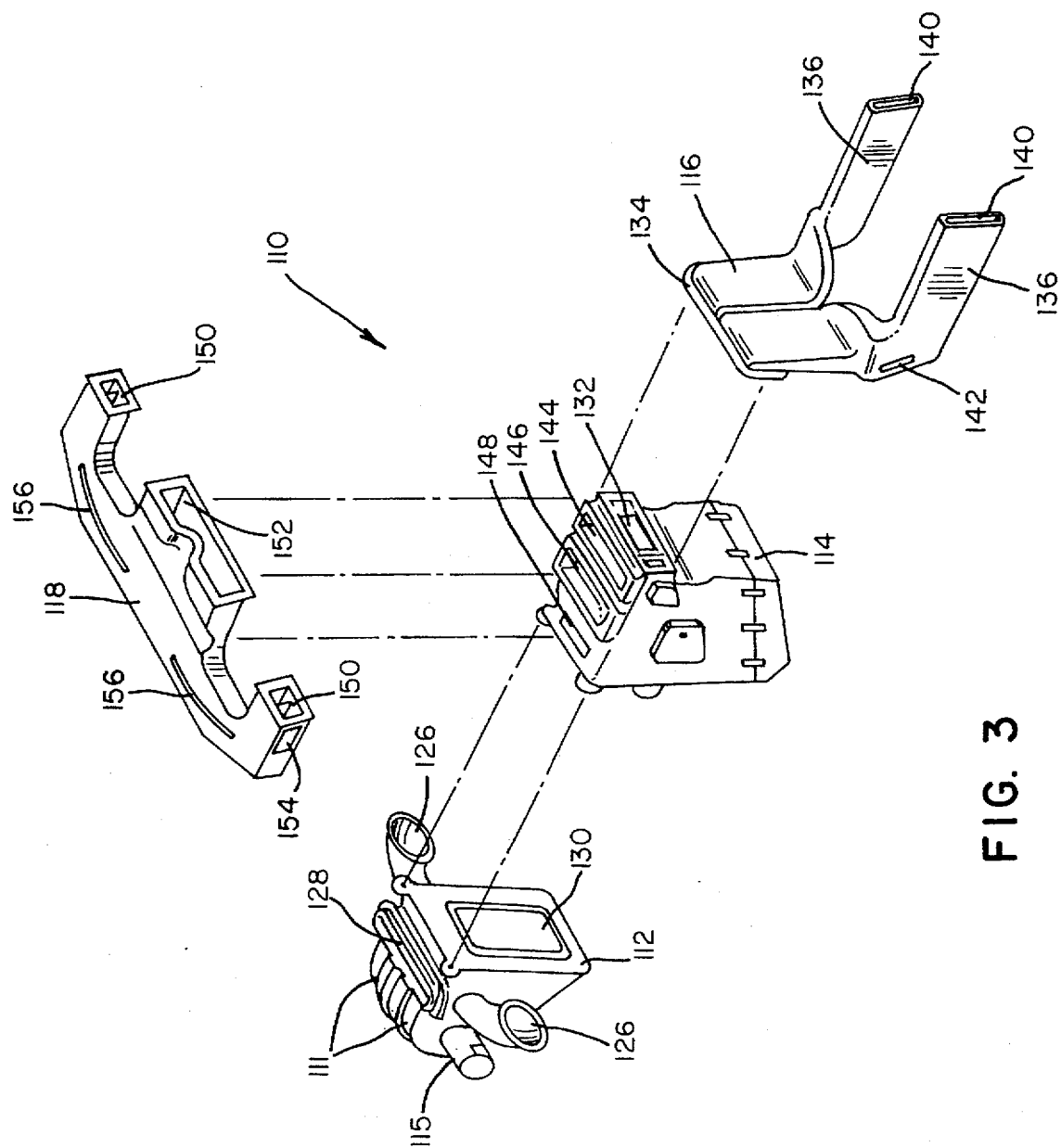
FIG. 3 is an exploded, perspective view, similar to that of FIG. 1, showing, however, a second embodiment of an integral, center-mounted air-handling system constructed in accordance with the teachings of the present invention.

Referring now to the drawings, and more particularly to FIGS. 1 and 2 thereof, a first embodiment of an integral, center-mounted air-handling system constructed in accordance with the principles of the present invention for use within an automotive vehicle is generally indicated by the reference character 10. The system 10 is seen to comprise a blower housing 12, an evaporator core/heater core housing 14, a floor duct assembly 16, and an instrument panel duct assembly 18. When the blower housing 12, the evaporator core/heater core housing 14, floor duct assembly 16, and the instrument panel duct assembly 18 are assembled together within the vehicle so as to comprise the integral, center-mounted air-handling system 10, as seen in FIG. 2, the evaporator core/heater core housing 14 is disposed rearwardly of the conventional vehicle firewall 20, as considered in the conventional forward/rearward directions of the vehicle, and is also disposed atop the conventional vehicle floor pan 22. The blower housing 12 is disposed forwardly or in front of the firewall 20 so as not to be visible in FIG. 2, the floor duct assembly 16 is disposed rearwardly of the evaporator core/heater core housing 14 and portions thereof extend rearwardly along the floor pan 22, and the instrument panel duct assembly 18 is disposed atop the evaporator core/heater core housing 14 as well as along the upper end portion of the firewall 20.

In accordance with the principles of the first embodiment of the present invention as illustrated within FIG. 1, the blower housing 12 houses a pair of blower units, not shown, which are disposed in a side-by-side relationship with respect to each other such that the rotary axes of the blower units are disposed vertically. Upon each lateral side of the blower housing 12, there is provided an intake duct component 24 wherein, within each intake duct component 24, a recirculation air intake 26 is defined within a rear surface wall portion thereof, while a fresh air intake 28 is defined within an upper surface wall portion thereof. As is well known, the recirculation air intakes 26 are fluidically connected to the passenger compartment of the vehicle so as to in fact recirculate the air within the passenger compartment, while the fresh air intakes 28 are fluidically connected to the ambient atmosphere outside the vehicle through means of suitable vent passages formed, for example, within the vehicle cowl, not shown. A suitable distribution door, also not shown, is interposed between each recirculation air intake 26 and its associated fresh air intake 28 such that depending upon the disposition of the distribution door, either fresh air or recirculation air is inducted into the blower housing 12.

The disposition of the distribution doors between the recirculation air intakes 26 and the fresh air intakes 28 is regulated by suitable controls, not shown, conventionally mounted upon the vehicle dashboard, and in a similar manner, the two blower units are also controlled so that the blower units are entirely independent with respect to each other. Additional distribution doors or plates may be provided within, for example, evaporator/heater core housing 14 or instrument panel assembly 18 such that each blower unit will discharge its outlet air through opposite lateral sides of the floor duct assembly 16 and the instrument panel duct assembly 18. In this manner, the blower units may be independently controlled and operated by, for example, the vehicle driver and/or vehicle passenger such that the vehicle is provided with a completely independent dual-zone environment both with respect to the provision of conditioned air as well as the temperature level thereof. In addition, in view of such independent operation and control of the blower units, the vehicle is, in effect, provided with built-in redundancy. More particularly, if one of the blower units experiences an operational malfunction or failure, the other blower unit can nevertheless operate so as to still provide the vehicle with desired heated or cooled air. Still yet further, the system 10 of the present invention may be incorporated within electrically powered vehicles. As is well known, however, electrically powered vehicles have a limited range of operation depending upon the amount of electricity which can be provided by means of the vehicle's batteries. It is therefore essential to conserve electrical power whenever and however possible. Consequently, if the driver of the vehicle is alone, then air flow to the passenger side of the vehicle is not essential and the blower unit controlling the air flow to the passenger side of the vehicle may be deactivated thereby conserving electrical power.

With reference still being made to FIG. 1, the blower housing 12 is also provided with a pair of air flow outlets 30 disposed side-by-side with respect to each other within a central portion of the rear wall surface of the housing 12, and the outlets 30 serve to conduct the blower outlet air toward and into the evaporator core/heater core 14 through means of an inlet, not shown, defined within a forward wall surface of the evaporated core/heater core housing 14. The evaporator core/heater core housing 14 is conventionally provided with an evaporator core, not shown in this embodiment, and a heater core, also not shown in this embodiment, as well as a plurality of distribution doors and a blend door, also not shown in this embodiment, whereby cooled or heated air flow paths are defined within the evaporator core/heater core housing 14. A floor outlet 32, for providing treated air to the floor duct assembly 16, is defined within a rear wall surface of the evaporator core/heater core housing 14. The floor duct assembly 16 is, in turn, provided with an inlet duct 34 formed within a forward wall surface thereof which is adapted to be abuttingly engaged with the floor outlet 32 of the evaporator core/heater core housing 14 such that the treated air exiting from floor outlet 32 can be conducted into the floor duct assembly 16. The floor duct assembly 16 is split into two divergent floor duct members 36 which extend longitudinally rearwardly within the vehicle upon opposite sides of a central humped portion 38 of the floor pan 22, and distal end portions of the floor duct members 36 define rear seat air duct outlets 40. The floor duct assembly 16 has a substantially L-shaped configuration as viewed from the side thereof, and it is seen that the inlet duct 34 thereof is disposed within a substantially vertical plane while the floor duct members 36 extend substantially horizontally. Front seat air duct outlets 42 are defined within side wall portions of the assembly 16 at the junction of the vertically disposed inlet duct portion 34 and the horizontally disposed floor duct members 36 so as to provide treated air flows to the front seat floor regions.

Referring back to the evaporator core/heater core housing 14, the upper surface thereof has an instrument panel outlet 44 defined within a rear portion thereof, a defrost air outlet 46 defined within a central portion thereof, and a demist air outlet 48 defined within a forward portion thereof. The instrument panel duct assembly 18 is seen to have a substantially E-shaped configuration as considered in plan view, and a pair of laterally outboard instrument panel outlets 50, as well as a pair Of substantially centralized or inboard instrument panel outlets 52, are fluidically connected to the instrument panel outlet 44 of the evaporator core/heater core assembly 14 so as to provide air-conditioned or cooled air into the vehicle cabin. In a somewhat similar manner, the instrument panel duct assembly 18 is also provided with a pair of laterally outboard demister outlets 54 formed within laterally outward sidewall portions of the duct assembly 18, the outlets 54 being fluidically connected to the demist air outlet 48 of the evaporator core/heater core assembly 18 so as to provide demist air to the front side windows of the vehicle. Lastly, the instrument panel duct assembly 18 is provided with a pair of laterally spaced defrost air outlets 56 for providing defrost air to the vehicle's front windshield. The defrost air outlets 56 are fluidically connected to the defrost air outlet 46 of the evaporator core/heater core assembly 14, and it is noted at this juncture that while the particular fluid paths for the instrument panel cooled air, demist air, and defrost air are not illustrated within the embodiment of FIG. 1, such flow paths will be specifically illustrated in connection with a further embodiment of the invention which will be described shortly hereafter, the structural specifics of such further embodiment being incorporated within the embodiment of the duct assembly 18 of FIG. 1.

It can be particularly appreciated from FIG. 2, particularly in conjunction with the structural components of FIG. 1, that the blower housing 12, the evaporator core/heater core housing 14, and floor duct assembly 16 are all centrally located within the vehicle and are symmetrically located with respect to a longitudinal centerline 58 of the vehicle which extends along the central portion 38 of the floor pan 22. Normally or conventionally, the blower housing and evaporator core/heater core housing are disposed to the right of the central portion 38 of the floor pan 22 so as to be disposed behind the vehicle glove box, within the passenger foot-well compartment, and in front of the vehicle firewall. By centralizing the housings 12 and 14, as well as the floor duct assembly 16, in accordance with the principles of the present invention, both the left and right foot-well compartments on both the driver and passenger sides of the vehicle are unencumbered whereby the steering column assemblies for the vehicle may be installed either upon the right or left side of the vehicle, as desired for manufacture, distribution, and sale within particular domestic or foreign markets, without any need for redesigning the vehicle in order to accommodate the air flow components or the steering assemblies thereof. Consequently, single vehicle designs and arrangements for the air flow components and the vehicle steering mechanisms or assemblies can be readily adapted for production and manufacture as either left-side or right side vehicles.

Referring now to FIG. 3, a second embodiment of the present invention is disclosed and is generally indicated by the reference character 110. This embodiment is quite similar to the first embodiment of FIGS. 1 and 2, and therefore a complete description of such embodiment will be omitted except for a brief description of those components of this embodiment which differ from those of the first embodiment of FIGS. 1 and 2. It is also noted that similar reference characters designate similar components, except that the reference characters of this embodiment of FIG. 3 are within the 100 series. In particular, the only significant difference between the embodiment of FIG. 3 and the embodiment of FIGS. 1 and 2 resides in the arrangement and external structure of the blower housing 112. In lieu of the substantially laterally or horizontally extending blower housing 12 of the first embodiment of FIGS. 1 and 2, the blower housing 112 of this second embodiment of the invention is characterized by a substantially greater vertical extent. The blower housing 112 is also seen to comprise a pair of blowers 111 disposed side-by-side with their rotary axes disposed horizontally, and one of the blower motors is illustrated at 115. In addition, in lieu of the pair of laterally spaced fresh air inlets 28 of the embodiment of FIGS. 1 and 2, the embodiment of FIG. 3 comprises a single elongated fresh air inlet 128 provided within a top surface wall of the blower housing 112. Similarly, a single blower outlet 130 is provided within a rear surface wall of the blower housing 112 for fluidic communication and connection with an air inlet, not shown, provided within a front wall surface of the evaporator core/heater core housing 114. By providing the blowers in their side-by-side relationships or arrangements, and with their respective axes disposed either horizontally or vertically as disclosed within the embodiments of FIGS. 3 or FIGS. 1 and 2, the entire air-handling arrangements or designs or systems may be readily accommodated within different vehicles.

Figure 4:
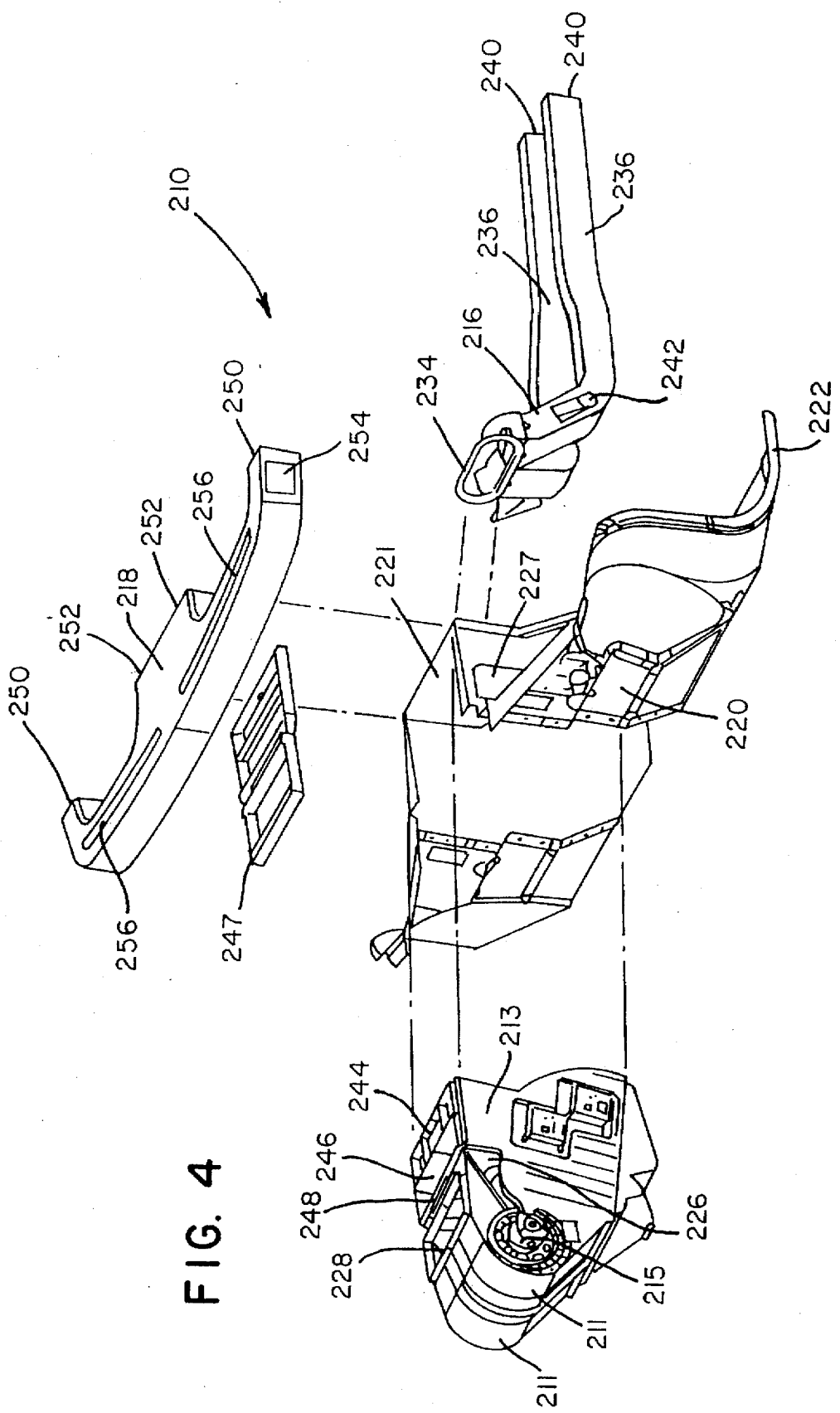
FIG. 4 is an exploded, perspective view of a third embodiment of an integral, center-mounted air-handling system constructed in accordance with the principles of the present invention.

Referring now to FIG. 4, a third embodiment of the present invention is disclosed and is generally indicated by the reference character 210. This embodiment is quite similar to the systems embodied or illustrated within FIGS. 1–3, and therefore a complete description of such embodiment will be omitted except for the description of those components of this embodiment which are different from those of the first and second embodiments of FIGS. 1–3. It is also noted that similar reference characters designate similar components, except that the reference characters of this embodiment of FIG. 4 are within the 200 series. In particular, one of the primary or significant differences between this embodiment of the inventive system as seen in FIG. 4 as compared to the embodiments of the inventive system of the present invention as illustrated within FIGS. 1–3 resides in the provision of the dual blowers, the evaporator core, and the heater core within a single, one-piece housing 213. This single, one-piece housing 213 is also illustrated within FIG. 5, and a cross-sectional view of the housing 213 is also illustrated within FIG. 6 wherein the various air flow patterns which can be generated and directed within the housing 213, and toward its various outlets, are also depicted.

Figure 5:
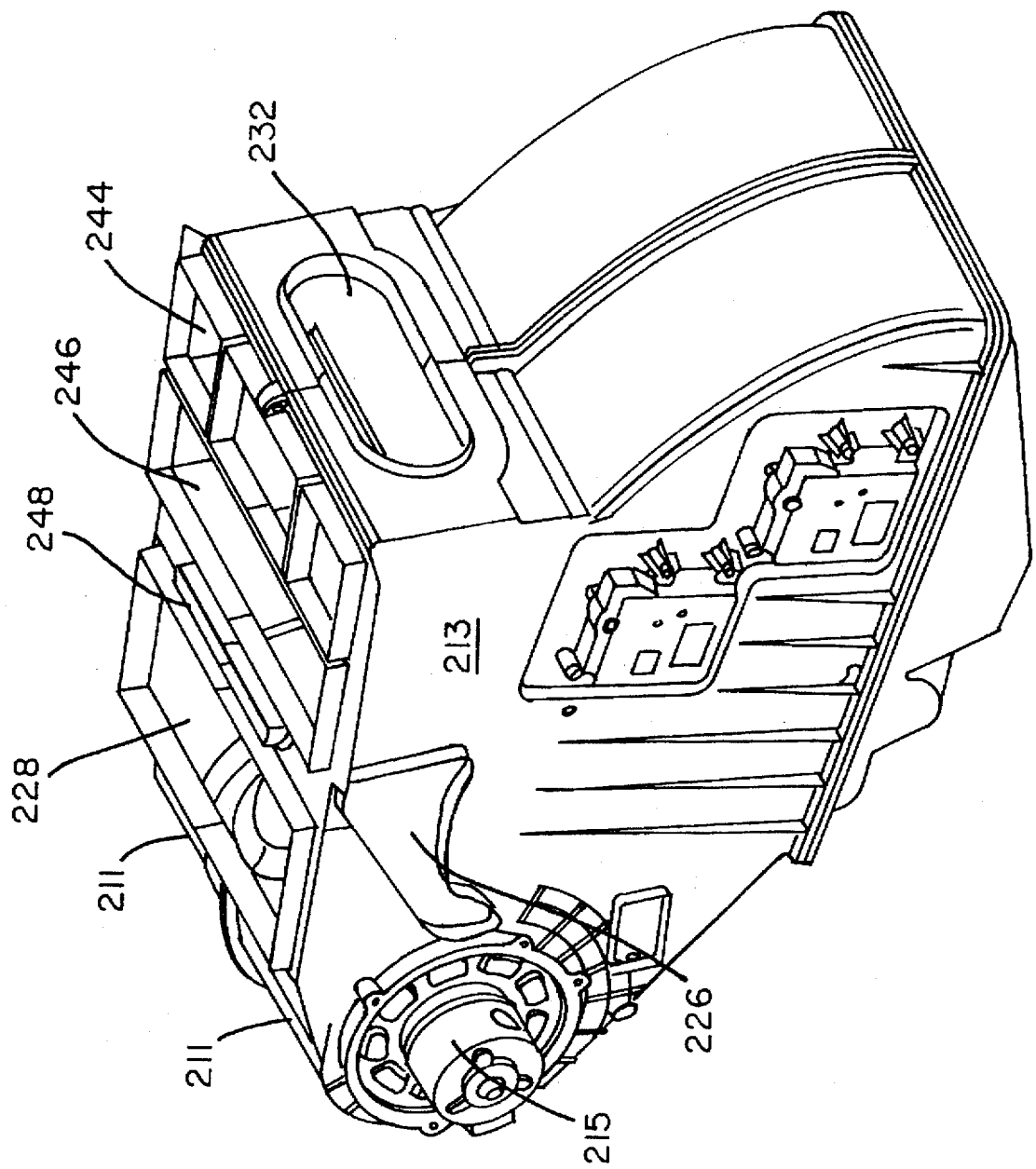
FIG. 5 is a perspective view of a one-piece blower/evaporator core/heater core housing for use within the third embodiment of the integral, center-mounted air-handling system of FIG. 4.

More particularly, as can be appreciated from FIGS. 4–5, the pair of blowers 211 are fixedly mounted within a forward portion of the single, one-piece housing 213 in a side-by-side relationship and with the rotary axes thereof disposed horizontally. The provision of the single, one-piece housing of course reduces the number of components in the system, as compared, for example, with the systems of FIGS. 1–3, and accordingly, production costs, as well as assembly costs, are significantly reduced. A fresh-air inlet 228 is defined within a forward, upper surface portion of the housing 213, while instrument panel outlets 244 are defined or provided within the most rearward portions of the upper surface region of the housing 213. A defrost air outlet 246 is defined or provided within an upper surface portion of the housing 213 which is disposed immediately adjacent to the instrument panel outlets 244, and similarly, a demist air outlet 248 is defined or provided within an upper surface portion of the housing 213 which is interposed between the defrost air outlet 246 and the fresh air inlet 228. A floor air outlet 232, for providing, for example, heated air to the front and rear seat regions of the vehicle, is defined or provided within a rear wall surface portion of the housing 213. The inlet duct portion 234 of the floor duct assembly 216 is adapted to be fluidically connected to the floor air outlet 232 of the blower/evaporator core/heater core housing 213, and the instrument panel duct assembly 218 is also adapted to be seated upon and fluidically connected to the instrument panel outlets 244, the defrost air outlet 246, and the demist air outlet 248, in a manner which will become clearer in connection with subsequent description provided hereinafter, so as to provide the various air flows to the different regions of the vehicle as desired. As seen in FIG. 4, a framework member 247 is adapted to be seated atop the upper surface portion of the housing 213 so as to surroundingly define the different air outlets 244, 246, and 248, and to be interposed between the air outlets 244, 246, 248 and the instrument panel duct assembly 218.

As was the case with the system embodiments of FIGS. 1–3, the composite, one-piece housing 213 may be disposed either within the passenger compartment or the engine compartment of the vehicle. If the housing 213 is in fact disposed within the engine compartment of the vehicle, that is, at a position forwardly of the firewall 220, then the firewall 220 is provided with a rearwardly recessed portion 221 at the central area thereof in order to accommodate the one-piece housing 213 and yet dispose the housing 213 at a position which would permit the housing 213 to be properly mated with fluidically connected to the floor duct assembly 216. Recirculation air inlets 227 are provided within sidewall portions of the rearwardly recessed section 221 of the firewall 220, and another air outlet, not shown, would likewise be provided within the rear surface wall of the recessed section 221 so as to provide fluidic communication between the floor air outlet 232 of the housing 213 and the floor air inlet 234 of the floor duct assembly 216.

Figure 6:
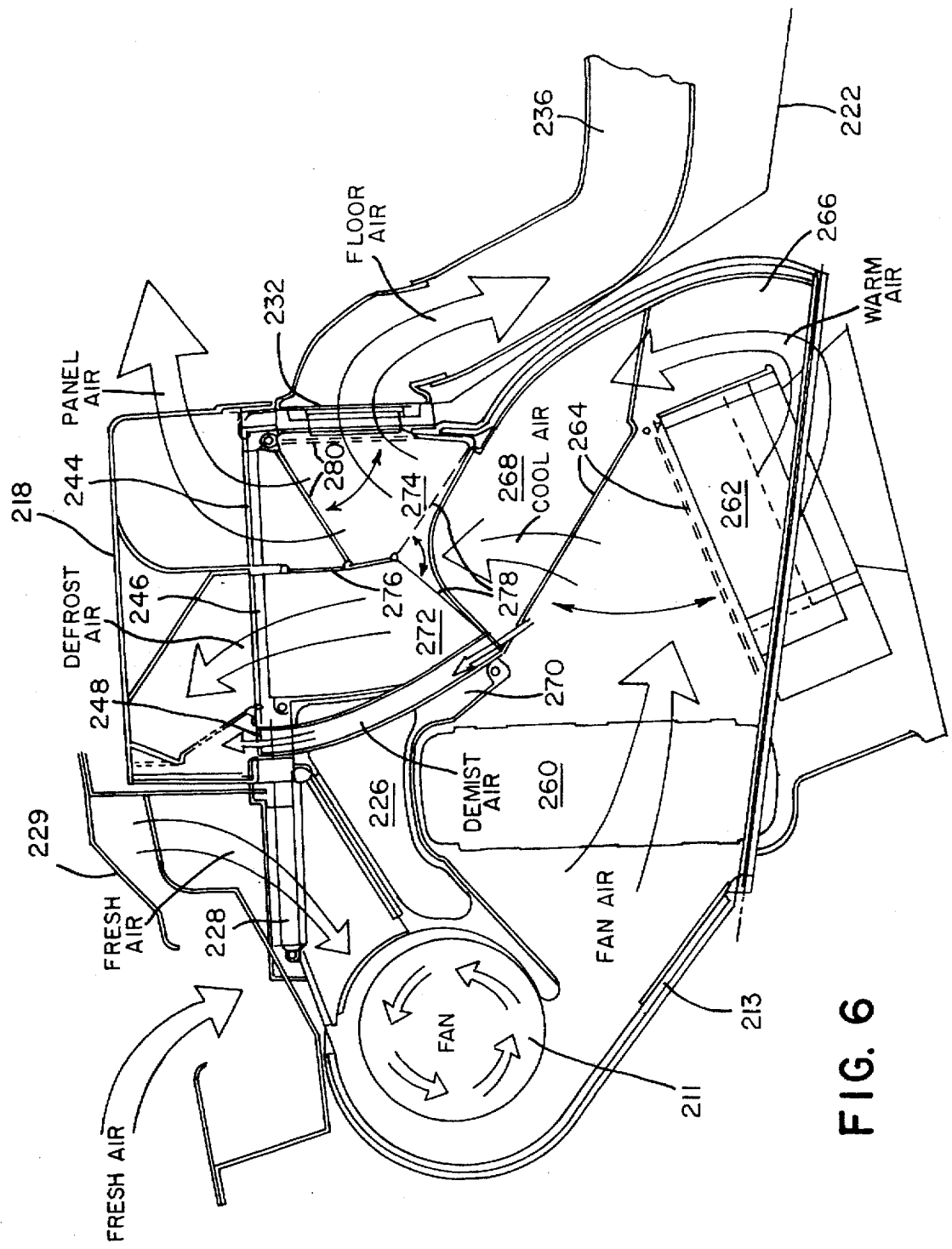
FIG. 6 is a cross-sectional view of the one-piece blower/evaporator core/heater core housing of FIG. 5, as operatively disposed within an automotive vehicle, schematically illustrating the various air flows entering the one-piece blower/evaporator core/heater core housing and being discharged therefrom.

With particular reference now being made to FIG. 6, the internal structural arrangement of the various components disposed within the composite housing 213 is illustrated along with the inlet and outlet air flows controlled so as to direct such air flows to the different regions of the vehicle interior as desired or required. One of the dual blowers or fans is shown at 211, and as a result of the operation of such blowers or fans 211, fresh air, denoted by means of the arrows labelled FRESH AIR, is inducted through an inlet formed or provided within the vehicle cowl 229 so as to, in turn, be inducted through the fresh air inlet 228 formed or provided within the upper surface portion of the composite housing 213. An evaporator core 260 is disposed within the housing 213 at a position downstream of the blowers 211 so as to receive the discharged air therefrom which is denoted by means of the arrow labelled FAN AIR, and a heater core 262 is disposed within the housing 213 at a position downstream of the evaporator core 260. A blend door 264 is pivotably mounted within the housing 213 between a first warm air position shown by a solid line, and a second cool air position shown by a dotted line. When the blend door 264 is disposed at its first warm air position, the FAN AIR will pass through the evaporator core 260 and will also be forced to pass through the heater core 262 so as to exit from the heater core 262 as air flow denoted by means of the arrow labelled WARM AIR. Alternatively, when the blend door 264 is disposed at its second cool air position whereby the blend door 264 effectively covers the heater core 262 so as to block the flow of the FAN AIR thereto, the FAN AIR is only cooled as a result of only passing through the evaporator core 260 and the resulting air is conducted upwardly within the housing 213 as air flow denoted by means of the arrow COOL AIR. It is additionally appreciated that the blend door 264 is pivotably mounted within the housing 213 at a position which effectively controls the introduction of the WARM AIR and COOL AIR flows within a lower air duct 266 and an upper air duct 268. More particularly, when the blend door 264 is disposed at its first warm air position, the blend door 264 effectively closes off or blocks the upper air duct 268 such that the FAN AIR is deflected by means of the blend door 264 downwardly toward the heater core 262. The WARM AIR discharged from the heater core 262 is then routed through the lower air duct 266 and then conducted upwardly through the upper air duct 268. On the other hand, when the blend door 264 is disposed at its second cool air position, the blend door 264, as a result of covering or blocking the heater core 262, similarly blocks off the lower air duct 266, and the FAN AIR is deflected upwardly by means of the blend door 264 so as to be conducted directly into the upper air duct 268. It is also further understood, of course, that the blend door 264 is capable of being controlled in such a manner that the blend door 264 can be disposed at positions intermediate the extreme first and second warm and cool air positions shown by the solid and dotted lines whereby the air flow entering the upper air duct 268 is a composite of COOL AIR and WARM AIR in accordance with a desired air temperature level.

With continued reference being made to FIG. 6, the upper-central region of the composite housing 213 is provided with a demist air duct 270 and an adjacent defrost air duct 272. The upper-rearward region of the housing 213 is similarly provided with a third air duct 274 which is disposed adjacent to the defrost air duct 272. The defrost air duct 272 and the air duct 274, into which floor air or instrument panel air is conducted, are separated by means of a partition 276, and a first distribution door 278 is pivotably mounted upon the lower distal end of the partition 276 so as to be disposed at a first floor-panel air position illustrated by a solid line, and a second defrost-demist air position shown by a dotted line. A second distribution door 280 is pivotably mounted within the floor-panel air duct 274 so as to be movable between a first floor air position as illustrated in solid line, and a second instrument panel air position as illustrated in dotted line. Consequently, when the first distribution door 278 is disposed at its first floor-panel air position, the air flow within upper air duct 268 is forced to enter or flow into the floor-panel air duct 274 whereby, depending upon the disposition of the second distribution door 280, the air flow is discharged either as instrument panel air, denoted by means of the arrow labelled PANEL AIR, through means of the instrument panel outlets 244 of the housing 213 and the instrument panel outlets 250 and 252 of the instrument panel duct assembly 218, or alternatively, the air flow is discharged as floor air, denoted by means of the arrow labelled FLOOR AIR, through means of the floor air outlet 232 of the housing 213 and the front seat air duct outlets 242, as well as the rear seat air duct outlets 240, of the floor duct assembly 216. In accordance with a still further alternative mode, when the first distribution door 278 is disposed at its second defrost-demist air position, the floor-panel air duct 274 is closed or blocked whereby the air flow within upper duct 268 is forced to enter or flow into the demist and defrost air ducts 270 and 272. These air flows within demist and defrost air ducts 270 and 272 and then discharged as DEMIST AIR and DEFROST AIR through means of the demist air outlet 248 and the defrost air outlet 246 of the housing 213 as well as the pair of demist air outlets 254 and the defrost air outlets 256 of the instrument panel duct assembly 218. As has been noted herein above, the actual temperature level of the various FLOOR AIR, PANEL AIR, DEFROST AIR, and DEMIST AIR flows can of course be suitably determined by means of the disposition of the blend door 264 between its two extreme positions.

Figure 7:
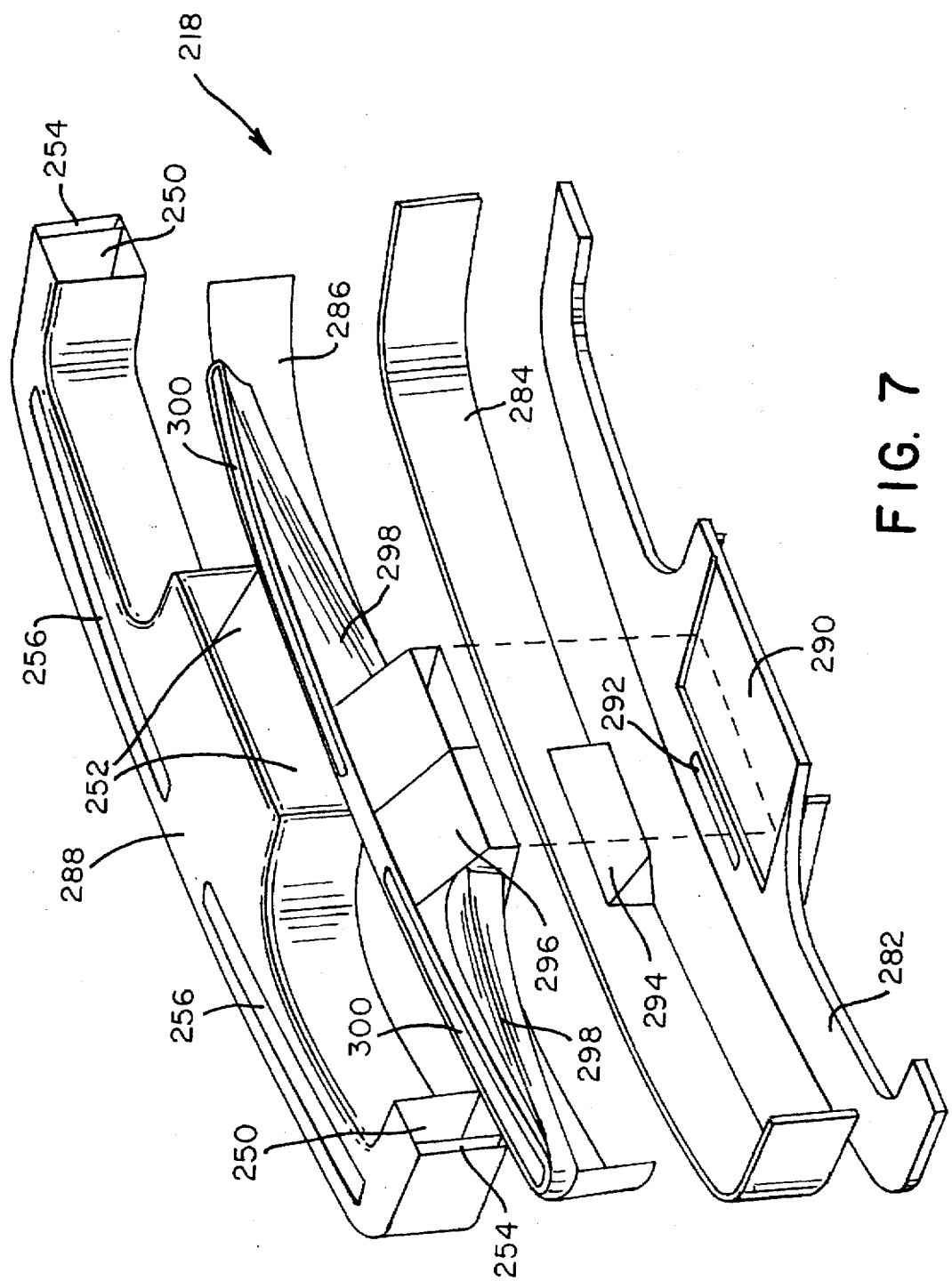
FIG. 7 is an exploded, perspective view of an integral instrument panel air-conditioning duct and structural cross-beam for an automotive vehicle constructed in accordance with the principles of the present invention.
Figure 8:
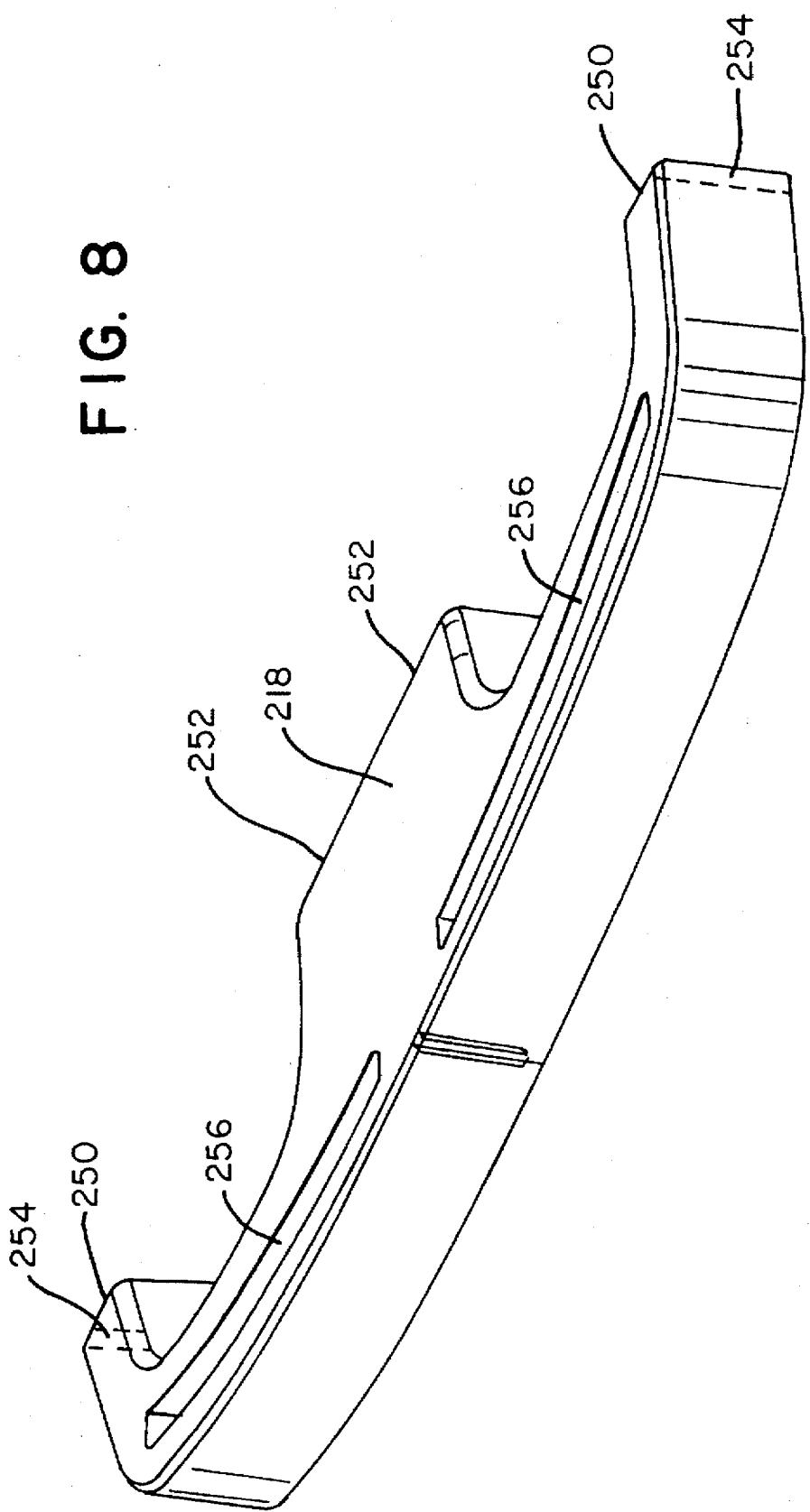
FIG. 8 is an assembled, perspective view of the integral instrument panel air-conditioning duct and structural cross-beam of FIG. 7.

With reference now being lastly made to FIGS. 7 and 8, the internal structural composition and arrangement of the components of the instrument panel duct assembly 218, as well as the relationship of such structure with respect to the various air outlets of the assembly 218, will now be described. While the description is also directed to the instrument panel duct assembly denoted by the reference character 218 and as previously disclosed within the embodiment of FIG. 4, it is noted that the instrument panel duct assembly 218 of the embodiment of FIG. 4 is precisely the same as the instrument panel duct assemblies 18 and 118 of the embodiments of FIGS. 1–3, and therefore the description of the instrument panel duct assembly 218, and its internal structural composition, is also applicable to the instrument panel duct assemblies 18 and 118.

As best seen in FIG. 7, the instrument panel duct assembly 218 comprises a base plate 282, an upstanding demist air separating wall 284, a defrost air duct 286, and an instrument panel duct cover 288. As will become more apparent hereinafter, the demist wall member 284 is adapted to be disposed within a forward region of the assembly 218 with its bottom edge portion fixedly secured to the upper surface of the base plate 282, while the defrost air duct 286 is adapted to be disposed somewhat rearwardly of the demist wall member 284 and with its bottom edge portion likewise fixedly secured to the upper surface of the base plate 282. The instrument panel cover member 288 is adapted to be matingly engaged with the base plate 282 so as to define an instrument panel housing therewith within which the defrost air duct 286 and the demist wall member 284 are enclosed. In accordance with one of the primary features of the present invention, all of the structural components comprising the instrument panel duct assembly 218, that is, the base plate 282, the demist wall member 284, the defrost air duct 286, and the instrument panel cover member 288, are fabricated from a suitable carbon composite material. In this manner, the instrument panel duct assembly 218 not only serves as a fluid conduit for conducting the various air flows from the single, one-piece housing 213 to the different panel air outlets 250 and 252, the demist air outlets 254, and the defrost air outlets 256, but in addition, due to the strength and structural integrity of the assembly 218 as a result of being fabricated from the noted carbon composite material, the assembly 218 serves as a structural cross-beam for the vehicle whereby separate instrument panel duct and cross-beam components are no longer required within the vehicle. Such an integration of functions and structures significantly reduces materials, fabrication, and assembly costs for the vehicle.

With continued reference being made to FIG. 7, the base plate 282 has a substantially rectangular aperture 290 defined within a central portion thereof whereby the aperture 290 is adapted to be disposed atop the one-piece housing 213 so as to be fluidically connected to the instrument panel outlets 244 and the defrost air outlet 246 so as to receive such air flows therethrough. An additional elongated aperture 292 is also defined or provided within a central portion of the base plate 282, but at a position forwardly of the aperture 290, so as to similarly be fluidically connected with the demist air outlet 248 of the housing 213. The demist wall member 284 has a hood portion 294 defined or provided at a central portion thereof, and when demist wall member 284 is properly seated upon and affixed to the base plate 282, hood portion 294 is seated over elongated aperture 292 so as to effectively capture the incoming DEMIST AIR flow discharged from demist air duct 270 and demist outlet 248 of housing 213. Such demist air flow is then distributed laterally outwardly within a laterally extending passageway defined between the front upstanding surface of demist wall member 284 and the inside, rearwardly disposed surfaces of the instrument panel cover member 288 so as to be fluidically conducted to the instrument panel demist air outlets 254. In a similar manner, the defrost air duct 286 is provided with a hood portion 296 at a central region thereof, and the hood portion 296 is adapted to be disposed rearwardly of the hood portion 294 of the demist wall member 284 so as to be seated above the front half portion of the panel-defrost air inlet aperture 290 and thereby be fluidically aligned with the defrost air outlet 246 of the housing 213 so as to effectively capture the incoming DEFROST AIR discharged from defrost air duct 272 and defrost outlet 246. Hood 296 is, in turn, fluidically connected to laterally extending defrost air conduits 298 disposed upon opposite sides of the hood 296, and a pair of defrost air outlets 300 are defined within upper surface portions of the defrost air duct 286 so as to be fluidically connected to the defrost air outlets 256 of the instrument panel cover member 288 when the entire instrument panel duct assembly 218 is assembled together. As can be further appreciated, just as the demist wall member 284 separated the demist air flow from the defrost and instrument panel air flows, the defrost air duct 286 separates the defrost air flow from the instrument panel air flow. In particular, the instrument panel air flow will flow upwardly through the rearward portion of the aperture 290 defined within the base plate 282, after being discharged PANEL AIR from the floor-panel air duct 274 and the panel outlets 244, and laterally outwardly through a passageway defined between the rearwardly disposed surfaces of the defrost air duct 286 and the forwardly disposed inside surfaces of the instrument panel cover member 288 so as to be discharged as instrument panel air from instrument panel air outlets 250 and 252.

INDUSTRIAL APPLICABILITY

In accordance with the foregoing, it may thus be seen that the present invention has industrial applicability in connection with automotive vehicles. In particular, the present invention is directed toward an integral, center-mounted air-handling system wherein the blower, evaporator core, and heater core components are located within the central portion of the vehicle so as to permit the vehicle to be readily adapted for left-side or right-side steering mechanisms without any need for redesigning the vehicle in order to accommodate the steering mechanisms or components upon either side of the vehicle. In addition, the air-handling system comprises a pair of blowers which are fully independently operable so as to provide the vehicle with dual-zone control and temperature level capabilities. Such dual blowers also provide the vehicle with built-in redundancy whereby in case of a malfunction or operational failure of one of the blowers, the vehicle may nevertheless be provided with required heated or cooled air. Still further, such independently operable blowers are particularly adapted for use within electrically powered vehicles whereby, for example, in lieu of both blowers being operated for providing treated air to both the driver and passenger sides of the vehicle, the passenger side blower may be turned off when, for example, no passengers are present within the vehicle thereby conserving electrical power so as to increase the operative range of the vehicle. The blower, evaporator core, and heater core components of the overall system may also be incorporated within a single, one-piece composite housing so as to substantially reduce materials, fabrication, and assembly costs of the system. Similarly, in accordance with a further feature of the present invention, the instrument panel duct assembly is preferably fabricated from a suitable carbon composite material whereby the instrument panel duct assembly serves as a structural cross-beam for the vehicle. In this manner, separate instrument panel duct and cross-beam components are no longer required, again significantly reducing materials, fabrication, and assembly costs of the vehicle.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent, is:

1. An integral, center-mounted airhandling system for an automotive vehicle, comprising:

at least one blower having at least one fresh air inlet, at least one recirculation air inlet, and at least one air outlet fluidically connected to said at least one blower for taking in fresh air and recirculation air and discharging said fresh air and said recirculation air out of said at least one air outlet as outlet air;

an evaporator core disposed within a housing and downstream of said at least one air outlet of said at least one blower for receiving and cooling said outlet air from said at least one blower;

a heater core disposed within said housing and downstream of said evaporator core for receiving and heating said cooled air discharged by said evaporator core;

a blend door interposed between said evaporator core and said heater core and pivotably movable between adjustable positions so as to determine the volume of air which may bypass said heater core and be discharged from said housing as cooled air, and which may be transmitted from said evaporator core to said heater core so as to be discharged from said housing as heated air; and an instrument panel duct assembly fluidically connected to said housing within which said evaporator core and said heater core are disposed for selectively receiving said cooled air and said heated air from said housing and for discharging said cooled air and said heated air into different regions of said automotive vehicle as instrument panel air, defrost air, and demist air;

characterized in that said at least one blower, said evaporator core, and said heater core are disposed at a central portion of said automotive vehicle such that said automotive vehicle can be adapted to be driven as either a right-side or left-side vehicle by having a steering assembly installed upon the right side or the left side of said vehicle without requiring rearrangement of the disposition of said at least one blower, said evaporator core, and said heater core within said automotive vehicle in order to accommodate said steering assembly upon either said right side or said left side of said vehicle.

2. The system as set forth in claim 1, characterized further in that:

said at least one blower comprises a pair of blowers independently operable for supplying said outlet air to said evaporator core and to said instrument panel duct assembly such that air is discharged from opposite sides of said instrument panel duct assembly whereby said vehicle is provided with dual-zone control and temperature levels upon driver and passenger sides thereof.

3. The system as set forth in claim 2, characterized further in that:

said pair of blowers are disposed in a side-by-side relationship with rotary axes thereof disposed vertically.

4. The system as set forth in claim 2, characterized further in that:

said pair of blowers are disposed in a side-by-side relationship with rotary axes thereof disposed horizontally.

5. The system as set forth in claim 2, characterized further in that:

said pair of blowers are disposed within said housing along with said evaporator core and said heater core such that a single, one-piece housing houses said pair of blower units, said evaporator core, and said heater core.

6. The system as set forth in claim 5, characterized further in that:

a floor duct assembly is fluidically connected to said housing, within which said evaporator core and said heater core are disposed, for conducting heated air to front and rear seat floor regions of said vehicle.

7. The system as set forth in claim 6, characterized further in that:

said single, one-piece housing comprises a floor air outlet and an instrument panel air outlet defined within a first air outlet duct, and a defrost air outlet and a demist air outlet defined within a second air outlet duct;

a first distribution door is movably disposed within said housing between a first position at which said first distribution door closes said first air outlet duct so as to permit air to be discharged through said second air outlet duct and said defrost and demist air outlets, and a second position at which said first distribution door closes said second air outlet duct so as to permit air to be conducted into said first air outlet duct toward said floor and instrument panel air outlets; and a second distribution door is movably disposed within said housing between a first position at which said second distribution door blocks said instrument panel air outlet so as to permit air to be discharged from said floor air outlet when said first distribution door is disposed at said second position, and a second position at which said second distribution door blocks said floor air outlet so as to permit air to be discharged from said instrument panel air outlet when said first distribution door is disposed at said second position.

8. The system as set forth in claim 5, characterized further in that:

said vehicle comprises a kickwall; and said single, one-piece housing within which said pair of blowers, said evaporator core, and said heater core are disposed is disposed rearwardly of said kickwall so as to be disposed within the passenger compartment of said vehicle.

9. The system as set forth in claim 5, characterized further in that:

said vehicle comprises a kickwall;

said single, one-piece housing, within which said pair of blowers, said evaporator core, and said heater core are disposed, is disposed forwardly of said kickwall so as to be disposed within the engine compartment of said vehicle; and said kickwall has a rearwardly extending recessed portion so as to accommodate the disposition of said single, one-piece housing within said engine compartment of said vehicle.

10. An airhandling system for an automotive vehicle, comprising:

a pair of blowers each one of which has a fresh air inlet, a recirculation air inlet, and an air outlet fluidically connected to a respective one of said blowers for taking in fresh air and recirculation air and discharging said fresh air and said recirculation air out of said respective one of said blowers as outlet air;

an evaporator core disposed within a housing and downstream of said air outlets of said pair of blowers for receiving and cooling said outlet air from said pair of blowers;

a heater core disposed within said housing and downstream of said evaporator core for receiving and heating said cooled air discharged by said evaporator core;

a blend door interposed between said evaporator core and said heater core and pivotably movable between adjustable positions so as to determine the volume of air which may bypass said heater core and be discharged from said housing as cooled air, and which may be transmitted from said evaporator core to said heater core so as to be discharged from said housing as heated air; and an instrument panel duct assembly fluidically connected to said housing, within which said evaporator core and said heater core are disposed, for selectively receiving said cooled air and said heated air from said housing and for discharging said cooled air and said heated air into different regions of said automotive vehicle as instrument panel air, defrost air, and demist air;

characterized in that said pair of blowers are independently controllable so as to be selectively operable and inoperable for supplying said outlet air to said evaporator core and said instrument panel duct assembly such that air is discharged from opposite sides of said instrument panel duct assembly whereby said vehicle is provided with dual-zone control and temperature levels within driver and passenger sides of said vehicle.

11. The airhandling system as set forth in claim 10, characterized further in that:

said pair of blowers are disposed within said housing along with said evaporator core and said heater core such that a single, one-piece housing houses said pair of blowers, said evaporator core, and said heater core.

12. The airhandling system as set forth in claim 11, characterized further in that:

a floor duct assembly is fluidically connected to said housing, within which said evaporator core and said heater core are disposed, for conducting heated air to front and rear seat floor regions of said vehicle.

13. An airhandling system for an automotive vehicle having an integral instrument panel air duct and a structural beam, comprising:

at least one blower having at least one fresh air inlet, at least one recirculation air inlet, and at least one air outlet, fluidically connected to said at least one blower for taking in fresh air and recirculation air and discharging said fresh air and said recirculation air out of said at least one air outlet as outlet air;

an evaporator core disposed within a housing and downstream of said at least one air outlet of said at least one blower for receiving and cooling said outlet air from said at least one blower;

a heater core disposed within said housing and downstream of said evaporator core for receiving and heating said cooled air discharged by said evaporator core;

a blend door interposed between said evaporator core and said heater core and pivotably movable between adjustable positions so as to determine the volume of air which may bypass said heater core and be discharged from said housing as cooled air, and which may be transmitted from said evaporator core to said heater core so as to be discharged from said housing as heated air; and an instrument panel duct assembly fluidically connected to said housing, within which said evaporator core and said heater core are disposed, for selectively receiving said cooled air and said heated air from said housing and for discharging said cooled air and said heated air into different regions of said automotive vehicle as instrument panel air, defrost air, and demist air;

characterized in that said instrument panel duct assembly is fabricated from a carbon composite material so as to comprise a structural cross-beam for said automotive vehicle whereby an integral instrument panel air duct assembly-structural cross-beam eliminates the need for separate instrument panel air duct assembly and structural cross-beam components within said automotive vehicle.

14. The system as set forth in claim 13, characterized further in that:

said at least one blower is disposed within said housing along with said evaporator core and said heater core such that a single, one-piece housing houses said at least one blower, said evaporator core, and said heater core.

15. The system as set forth in claim 13, characterized further in that:

said housing, within which said evaporator core and said heater core are disposed, comprises a demist air outlet, a defrost air outlet, and an instrument panel air outlet; and said instrument panel duct assembly comprises a demist air inlet for receiving said demist air from said demist air outlet of said housing, a pair of laterally spaced demist air outlets for discharging demist air into first demist air regions within said vehicle, a defrost air inlet for receiving said defrost air from said defrost air outlet of said housing, a pair of laterally spaced defrost air outlets for discharging defrost air into second defrost air regions of said vehicle, a panel air inlet for receiving said panel air from said panel air outlet of said housing, and a plurality of panel air outlets for discharging panel air into third panel air regions of said vehicle.

16. The system as set forth in claim 15, characterized further in that said instrument panel duct assembly comprises:

a base plate having said demist air inlet, said defrost air inlet, and said panel air inlet defined therein;

an instrument panel cover member for mating with said base plate and having said demist air, defrost air, and panel air outlets defined therein;

a demist wall member disposed upon said base plate and within said cover member for separating said demist air, entering said demist air inlet defined within said base plate, from said defrost air and said panel air, entering said defrost air and said panel air inlets defined within said base plate, and for conducting said demist air toward said demist air outlets of said instrument panel cover member; and a defrost air duct, disposed upon said base plate and within said cover member, for separating said defrost air, entering said defrost air inlet defined within said base plate, from said panel air, entering said panel air inlet defined within said base plate, and for conducting said defrost air toward said defrost air outlets defined within said instrument panel cover member.

17. The system as set forth in claim 15, characterized further in that:

said plurality of panel air outlets defined within said instrument panel duct assembly comprises a pair of panel air outlets defined within laterally spaced outboard sections of said instrument panel duct assembly, and a pair of panel air outlets defined within laterally spaced inboard sections of said instrument panel duct assembly located within substantially central regions of said vehicle.

18. The system as set forth in claim 16, characterized further in that:

said demist wall member comprises a first hood portion which is seated over said demist air inlet defined within said base plate of said instrument panel duct assembly so as to capture said demist air entering said demist air inlet defined within said base plate; and said defrost air duct comprises a second hood portion which is seated over said defrost air inlet defined within said base plate of said instrument panel duct assembly so as to capture said defrost air entering said defrost air inlet defined within said base plate.

19. The system as set forth in claim 14, characterized further in that:

said at least one blower disposed within said housing comprises a pair of blowers independently controllable so as to be selectively operable and inoperable for supplying said outlet air to said evaporator core and said instrument panel duct assembly such that air is discharged from opposite sides of said instrument panel duct assembly whereby said vehicle is provided with dual-zone control and temperature levels within driver and passenger sides of said vehicle.

20. The system as set forth in claim 15, characterized further in that:

said housing, within which said evaporator core and said heater core are disposed, comprises a floor air outlet;

said floor air outlet and said instrument panel air outlet are defined within a first air outlet duct within said housing, and said defrost air outlet and said demist air outlet are defined within a second air outlet duct within said housing;

a first distribution door is movably disposed within said housing between a first position at which said first distribution door closes said first air outlet duct so as to permit air to be discharged through said second air outlet duct and said defrost and demist air outlets, and a second position at which said first distribution door closes said second air outlet duct so as to permit air to be conducted into said first air outlet duct toward said floor and instrument panel air outlets; and a second distribution door is movably disposed within said housing between a first position at which said second distribution door blocks said instrument panel air outlet so as to permit air to be discharged from said floor air outlet when said first distribution door is disposed at said second position, and a second position at which said second distribution door blocks said floor air outlet so as to permit air to be discharged from said instrument panel air outlet when said first distribution door is disposed at said second position.

* * * * *